(12) United States Patent
Kobayashi et al.

(10) Patent No.: US 10,429,882 B2
(45) Date of Patent: Oct. 1, 2019

(54) CLOCK GENERATOR AND PROCESSOR SYSTEM

(71) Applicant: MEGACHIPS TECHNOLOGY AMERICA CORPORATION, San Jose, CA (US)

(72) Inventors: Alan Kobayashi, Los Altos, CA (US); Sujan Thomas, Pleasanton, CA (US); Ramesh Dandapani, Cupertino, CA (US); Johnny Garrett, Newark, CA (US)

(73) Assignee: MEGACHIPS TECHNOLOGY AMERICA CORPORATION, San Jose, CA (US)

( * ) Notice: Subject to any disclaimer, the term of this patent is extended or adjusted under 35 U.S.C. 154(b) by 91 days.

(21) Appl. No.: 15/635,421

(22) Filed: Jun. 28, 2017

(65) Prior Publication Data

US 2017/0300081 A1   Oct. 19, 2017

Related U.S. Application Data

(63) Continuation of application No. PCT/US2015/067629, filed on Dec. 28, 2015.
(Continued)

(51) Int. Cl.
*G06F 1/08* (2006.01)
*G06F 1/04* (2006.01)
(Continued)

(52) U.S. Cl.
CPC ............ *G06F 1/08* (2013.01); *G06F 1/04* (2013.01); *G06F 7/588* (2013.01); *G06F 21/10* (2013.01); *G06F 21/60* (2013.01)

(58) Field of Classification Search
None
See application file for complete search history.

(56) References Cited

U.S. PATENT DOCUMENTS 4,951,237 A * 8/1990 Essenwanger ........ G06F 1/0353
327/107
6,642,754 B1 * 11/2003 Dobramysl ............. G06F 1/025
327/105
(Continued)

FOREIGN PATENT DOCUMENTS

JP   2003-216266   7/2003
JP   2008172512    7/2008

OTHER PUBLICATIONS

Japanese Office Action dated Jul. 24, 2018 in Japanese Application No. 2017-529709.
(Continued)

*Primary Examiner* — Paul Yen
(74) *Attorney, Agent, or Firm* — XSensus LLP

(57) ABSTRACT

A clock generator outputs a processor clock that serves as an operation reference for a processor for use in a content protection system. The clock generator includes a direct digital synthesis and a random number generator. The direct digital synthesizer includes a phase accumulator and outputs the processor clock. The phase accumulator accumulates a setup value in synchronization with a reference clock. The random number generator generates random numbers. The setup value changes based on the random numbers.

7 Claims, 7 Drawing Sheets

Related U.S. Application Data

(60) Provisional application No. 62/098,744, filed on Dec. 31, 2014.

(51) Int. Cl.
  *G06F 21/10* (2013.01)
  *G06F 7/58* (2006.01)
  *G06F 21/60* (2013.01)

(56) References Cited

U.S. PATENT DOCUMENTS

| | | |
|---|---|---|
| 2003/0145243 A1 | 7/2003 | Aikawa |
| 2004/0090694 A1 | 5/2004 | Chickanosky |
| 2011/0199127 A1 | 8/2011 | Turner |
| 2011/0260749 A1 | 10/2011 | Deas et al. |
| 2014/0168199 A1 | 6/2014 | Yanagi et al. |
| 2014/0192264 A1 | 7/2014 | Yi et al. |

OTHER PUBLICATIONS

International Search Report dated Mar. 24, 2016 in PCT/US2015/067629, filed on Dec. 28, 2015.
Written Opinion ddated Mar. 24, 2016 in PCT/US2015/067629, filed on Dec. 28, 2015.
"HDCP deciphered White Paper" Digital Content Protection, Jul. 2008, 12 pages.
High-bandwidth Digital Content Protection System: Mapping HDCP to Display Port, Revision 2.2, Digital Content Protection LLC, 2012, 74 pages.

* cited by examiner

F I G. 2
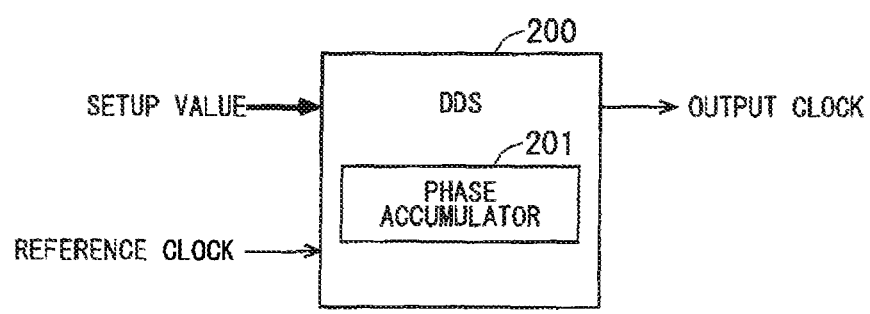

F I G . 5
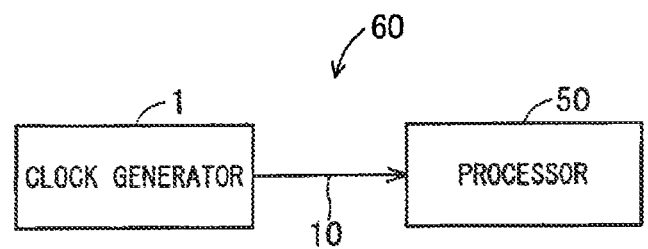

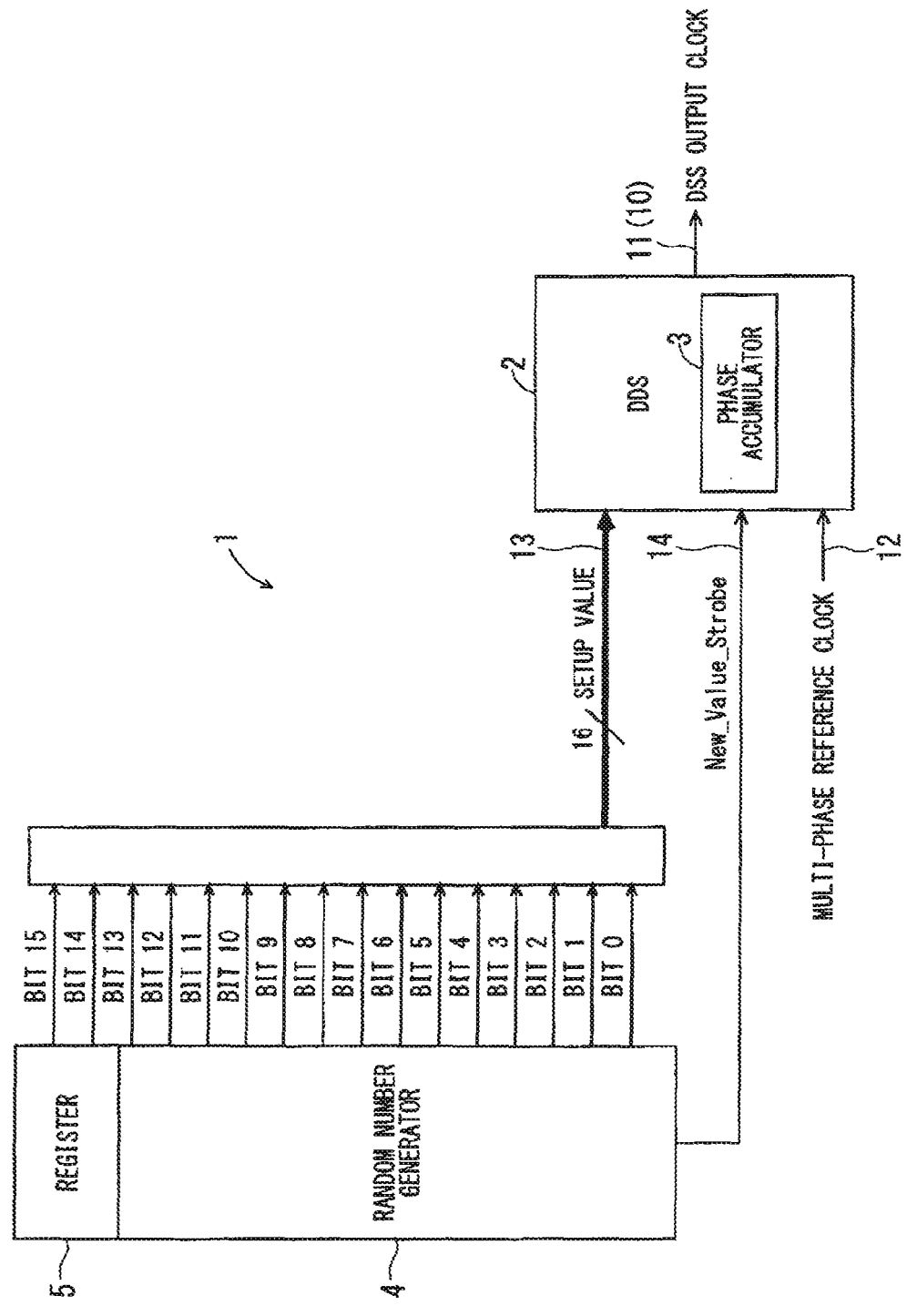

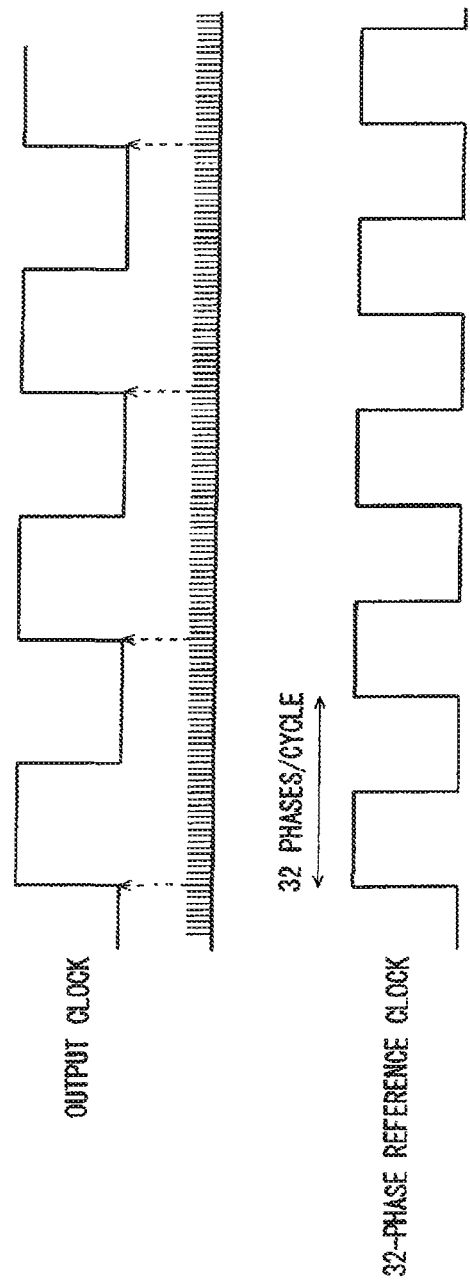

CLOCK GENERATOR AND PROCESSOR SYSTEM

TECHNICAL FIELD

The present invention relates to a clock generator.

BACKGROUND ART

High-bandwidth digital content protection (HDCP) is known as a content protection protocol for protecting media content.

PRIOR ART DOCUMENTS

Non Patent Documents

Non Patent Document 1: "HDCP Deciphered", White Paper, Digital Content Protection LLC, July 2008
Non Patent Document 2: "High-bandwidth Digital Content Protection System Mapping HDCP to DisplayPort", Revision 2.2, Digital Content Protection LLC, Dec. 21, 2012

SUMMARY OF INVENTION

Problem to be Solved by the Invention

A content protection system employing a content protection technology such as HDCP is desired to be resistant to side channel attack known as power analysis attack.

The present invention has an object to provide technology of making a content protection system resistant to side channel attack.

Means for Solving the Problem

According to one aspect of the present invention, a clock generator outputs a processor clock that serves as an operation reference for a processor for use in a content protection system. The clock generator includes a direct digital synthesis and a random number generator. The direct digital synthesizer includes a phase accumulator and outputs the processor signal. The phase accumulator accumulates a setup value in synchronization with a reference clock. The random number generator generates random numbers. The setup value changes based on the random numbers.

Effects of the Invention

The content protection system is resistant to power analysis attack.

BRIEF DESCRIPTION OF DRAWINGS

FIG. 2 illustrates a DDS.
FIG. 5 illustrates the configuration of a processor system.
FIG. 6 illustrates the configuration of a modification of the clock generator.
FIG. 7 illustrates the operation of the modification of the clock generator.

DESCRIPTION OF EMBODIMENTS

Figure 1:
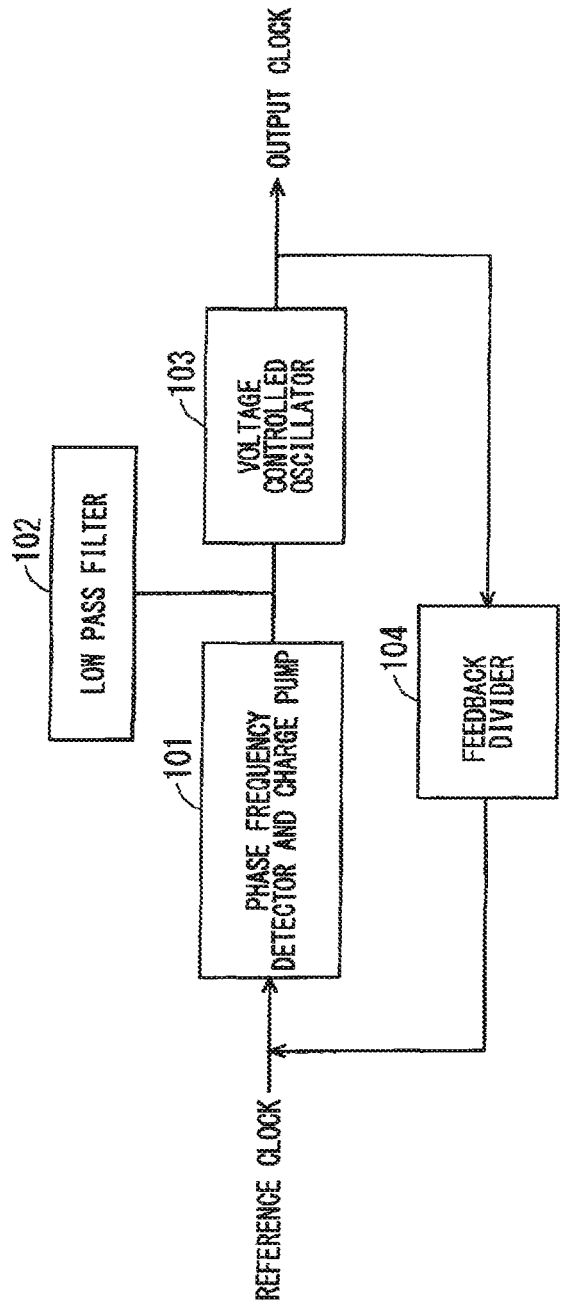
FIG. 1 illustrates a typical configuration of a clock generation circuit that involves PLL.

FIG. 1 illustrates a typical configuration of a clock generation circuit that involves an analog phase lock loop, or a phase locked loop (PLL). The clock generation circuit illustrated in FIG. 1 includes a phase frequency detector and charge pump 101, a low pass filter 102, a voltage controlled oscillator 103, and a feedback divider 104. The clock generation circuit illustrated in FIG. 1 resists to an attempt to a sudden change in output clock frequency (by changing the value of the feedback divider 104, for example) due to the presence of the low pass filter 102 that is required for the stability of the loop.

Figure 3:
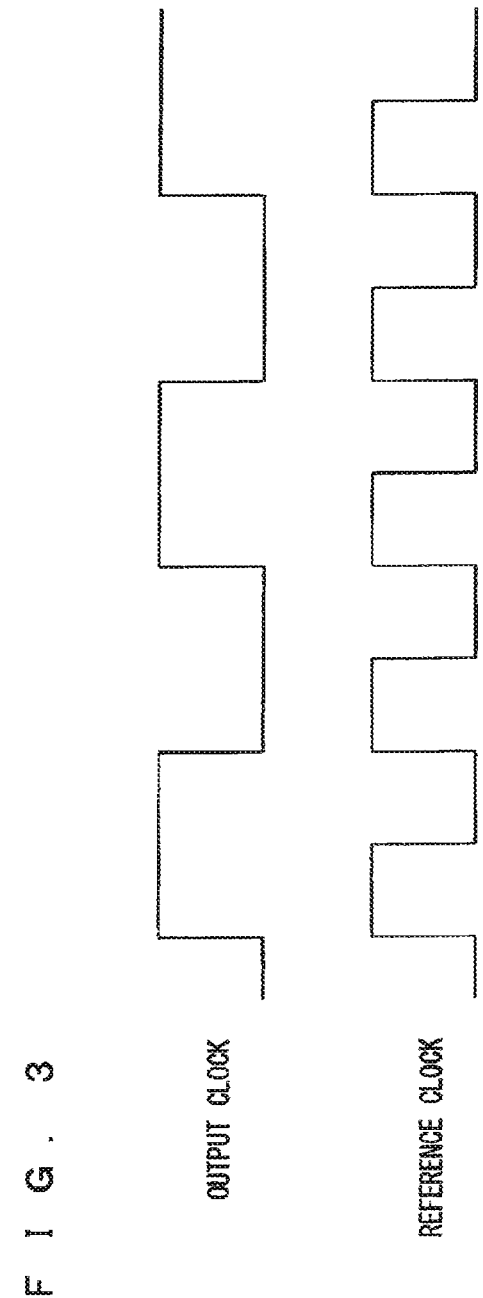
FIG. 3 illustrates the operation of the DDS.

In comparison with the clock generation circuit above, a direct digital synthesis, or synthesizer (DDS) 200 (see FIG. 2) has much higher ability to change the output clock frequency. The DDS 200 includes a phase accumulator 201 that accumulates a setup value. The DDS 200 generates a rising clock edge every time the accumulation value of the phase accumulator 201 wraps around. For example, as illustrated in FIG. 3, a 16-bit phase accumulator 201 (that is, the maximum value of $2^{16}$, or 65,536) generates a rising or falling clock edge every two reference clock cycles when the setup value is set to $2^{15}$ (=32,768).

Figure 4:
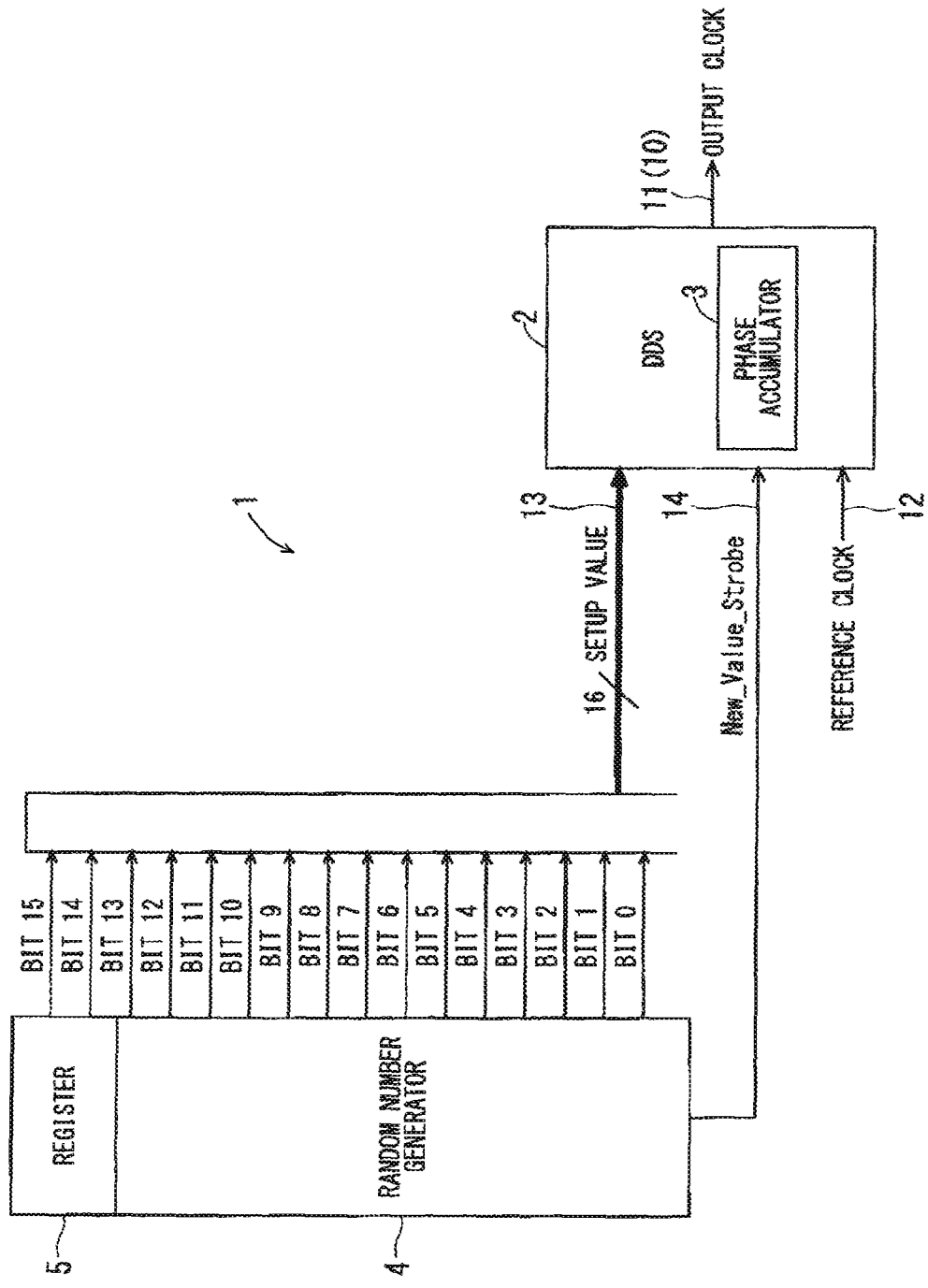
FIG. 4 illustrates the configuration of a clock generator.

The clock generator 1 according to this embodiment is a clock generator including the DDS above. FIG. 4 illustrates the configuration of the clock generator 1 according to this embodiment. As illustrated in FIG. 5, the clock generator 1 generates and outputs a processor clock 10 that serves as an operation reference for the processor 50 for use in a content protection system employing the content protection technology such as HDCP. The processor 50 operates in synchronization with the processor clock 10 from the clock generator 1. The processor 50 and the clock generator 1 constitute a processor system 60. The processor system 60 is, for example, a digital display that receives AV stream content protected in HDCP 2.2. The processor system 60 may be a digital AV receiver capable of receiving and retransmitting the AV stream content protected in HDCP 2.2.

The processor 50 is used in a content protection system employing, for example, the HDCP version 2.2 (HDCP 2.2) as the content protection technology. The processor 50 performs data encryption or decryption. For example, the processor 50 decrypts a digital signature with a public key, for example, an RSA public key, and validates the digital signature based on the decryption result. Alternatively, the processor 50 may encrypt content data or may decrypt the encrypted content data.

As illustrated in FIG. 4, the clock generator 1 includes a DDS 2, a random number generator 4, and a register 5. The DDS 2 operates based on a reference clock 12. The DDS 2 includes a phase accumulator 3 as a core component. An output clock 11 of the DDS 2 is used as the processor clock 10.

The phase accumulator 3 is an N-bit digital phase accumulator operating based on the reference clock 12. N is set at, for example, "16." The phase accumulator 3 accumulates a 16-bit setup value 13 every time the reference clock 12 rises. The DDS 2 outputs a rising edge every time the accumulation value of the phase accumulator 3 wraps around. In other words, the DDS 2 generates a rising edge in the output clock 11 (processor clock 10) every time the accumulation value of the phase accumulator 3 wraps around. When reaching $2^{16}-1$ (=65,535), the accumulation value in the phase accumulator 3 wraps around, thereby generating a rising edge in the output clock 11. Also, when the accumulation value of the phase accumulator 3 reaches $2^{15}$ (=32,768), the DDS 2 generates a falling edge in the output clock 11.

A frequency of the output clock 11 of the DDS 2 including the N-bit phase accumulator 3, f_DDS_Output_Clock, is expressed by Expression (1) below using a frequency of the reference clock 12, f_Reference_Clock, and a value of the setup value 13, Value.

$$f\_DDS\_Output\_Clock = f\_Reference\_Clock * Value/2^N \qquad (1)$$

In this embodiment, by incorporating an output value from the random number generator 4 into the setup value 13, the frequency randomization of the output clock 11 of the DDS 2 is realized. Specifically, as a result of the setup value 13 changing based on a random number output from the random number generator 4, the frequency randomization of the output clock 11 of the DDS 2 is realized. Consequently, the frequency of the processor clock 10 used by the processor 50 in the content protection system changes randomly. The content protection system is accordingly resistant to side channel attack. This will be described below in detail.

The random number generator 4 generates and outputs random numbers. The random number generator 4 is, for example, a true random number generator (TRNG). The random number generator 4 may be a pseudo-random number generator (PRNG). The random number generator 4 outputs random numbers of 14 bits. The output values (random numbers) of 14 bits output from the random number generator 4 are incorporated into the values of 16 bits constituting the setup value 13. For example, the output values of 14 bits of the random number generator 4 are used as the values of the 14 low order bits in the values of 16 bits constituting a setup value 13. Of the output values of the random number generator 4, 0- to 13-bit values are respectively used as 0- to 13-bit values of the setup value 13.

Of the values of 16 bits constituting the setup value 13, values of two high order bits (14- and 15-bit values) are set for the register 5. The processor 50 sets values for the register 5. Specifically, the processor 50 sets values of the two high order bits of the values of 16 bits constituting the setup value 13.

The random number generator 4 updates an output value (random number). For example, the random number generator 4 updates an output value (random number) with the same period as the period of the reference clock 12. In contrast, the values of two bits in the register 5 remain constant after being initialized. The setup value 13 changes every time the output value of the random number generator 4 is updated.

In this manner, by making the rate of updating the output value of the random number generator 4 comparable to the reference clock rate, the rate of randomizing the frequency of the output clock 11 of the DDS 2 (the clock frequency of the processor 50 of the content protection system) is made comparable to the reference clock rate. The values of two bits (14- and 15-bit values of the setup value 13) in the register 5 determine the extent of the frequency randomization of the output clock 11 of the DDS 2. If it is not necessary to determine the extent of the frequency randomization of the output clock 11 of the DDS 2, all the bits of the setup value 13 may be generated by the random number generator 4.

Although the values of the two high order bits of the values of 16 bits constituting the setup value 13 are set for the register 5, the value of the most significant bit alone may be set, or the values of not less than three high order bits may be set.

After updating the output value, the random number generator 4 sets New_Value_Strobe input to the DDS 2 at a High level for a certain period of time. The DDS 2 latches the signal level of New_Value_Strobe every time the reference clock 12 rises. At the High level of the latched signal level, the DDS 2 latches and fetches the setup value 13 input, and accumulates the fetched setup value 13. The DDS 2 updates the frequency of the output clock 11 immediately after the updated setup value 13 is fetched.

In this manner, the frequency of the processor clock 10 used by the processor 50 for use in the content protection system is aggressively modulated using random numbers, thereby making the content protection system resistant to side channel attack.

The approach of determining a setup value 13 based on a random number output from the random number generator 4 is not limited to the approach above. For example, a value obtained by adding a random number to a fixed value may be used as the setup value 13.

Alternatively, as illustrated in FIG. 6, a multi-phase reference clock 12 may be used as the reference clock 12. The DSS 2 operates based on the multi-phase reference clock 12, thereby increasing the versatility of the output clock 11 of the DDS 2. For example, for a reference clock 12 having 32 phases, the DDS 2 can determine a timing at which a wraparound occurs with the accuracy obtained by dividing the period of the reference clock 12 by 32. FIG. 7 shows an example of the relationship between the output clock 11 of the DDS 2 and the 32-phase reference clock 12. An example operation of the DSS 2 illustrated in FIG. 6 will be described below. In the description below, 32 clocks constituting the 32-phase reference clock 12 will be referred to as first to thirty-second phase clocks. In the 32-phase reference clock 12, the phase increases in the order of the first phase clock, the second phase clock, . . . , and the thirty-second phase clock. $2^{16}-1$ (=65,535) may be referred to as a first reference value, and $2^{15}$ (=32,768) may be referred to as a second reference value.

In the DSS 2 illustrated in FIG. 6, for example, the 16-bit phase accumulator 3 accumulates a setup value 13 every time the first phase clock rises. When the accumulation value of the phase accumulator 3 reaches a value smaller than the first reference value and also closest to the first reference value at certain rising of the first phase clock, the DDS 2 causes the accumulation value to wrap around at rising of any one of the first to thirty-second phase clocks. When the accumulation value wraps around, a rising edge occurs in the output clock 11.

Hereinafter, the rising of the first phase clock, at which the accumulation value reaches the value smaller than the first reference value and also closest to the first reference value, may be referred to as "first reference rising." The rising following the first reference rising of the first phase clock may be referred to as "second reference rising." For the accumulation value, the value smaller than the first reference value and closest to the first reference value may be referred to as a "neighborhood value." The accumulation value reaches the neighborhood value at the first reference rising of the first phase clock.

Herein, if no wrap-around occurs, the accumulation value reaches the neighborhood value at the first reference rising of the first phase clock and reaches "neighborhood value+ setup value" at the following second reference rising. Letting the value obtained by subtracting the neighborhood value from the first reference value be referred to as a "difference value," it can be considered that the accumulation value reaches the first reference value at the timing after a lapse of a period obtained by multiplying the cycle of the first phase clock by "difference value/setup value" from the first reference rising. Hereinafter, this timing is referred to as "first reference value generation timing." The first reference value generation timing can be said to be the timing at which the accumulation value matches the first reference value.

The DDS 2 identifies the phase clock with the number closest to the value obtained by multiplying "difference value/setup value" by 32 out of the first to thirty-second phase clocks. Then, with the identified phase clock being a phase clock to be used, the DDS 2 causes the accumulation value to wrap around at rising between the first reference rising and the second reference rising in the phase clock to be used. The rising between the first reference rising and the second reference rising in the phase clock to be used becomes close to the first reference value generation timing. Therefore, the DDS 2 causes the accumulation value to wrap around at the rising between the first reference rising and the second reference rising in the phase clock to be used, thereby causing the accumulation value to wrap around at almost the same timing as the first reference value generation timing.

After causing the accumulation value to wrap around between the first reference rising and the second reference rising of the first phase clock, the DDS 2 sets the initial value of the accumulation value to "setup value−difference value." Then, the phase accumulator 3 adds a setup value to the accumulation value (initial value) at the second reference rising of the first phase clock. After that, the DDS 2 operates similarly.

For example, with the value of the setup value 13, Value, of 13, the neighborhood value is 65533 (=13*5041). The difference value is accordingly 2 (=65535−65533). In this case, the first reference value generation timing is the timing after a lapse of the period obtained by multiplying the cycle of the first phase clock by 2/13 from the first reference rising.

Of the first to thirty-second phase clocks, the phase clock with the number closest to the value (approximately 4.9) obtained by multiplying 2/13 by 32 is the fifth phase clock. The DDS 2 causes the accumulation value to wrap around at rising between the first reference rising and the second reference rising in the fifth phase clock. After causing the accumulation value to wrap around, the DDS 2 sets the initial value of the accumulation value to "13−2." Then, at the second reference rising of the first phase clock, the phase accumulator 3 adds 13 to 11 that is the Initial value of the accumulation value. Then, when the accumulation value reaches 65531 (=11+13*5040) that is the neighborhood value, the difference value is 4 (=65535−65531). In this case, the first reference value generation timing is the timing after a lapse of the period obtained by multiplying the cycle of the first phase clock by 4/13 from the first reference rising.

Of the first to thirty-second phase clocks, the phase clock with the number closest to the value (approximately 9.8) obtained by multiplying 4/13 by 32 is the tenth phase clock. The DDS 2 causes the accumulation value to wrap around at rising between the first reference rising and the second reference rising in the tenth phase clock. After causing the accumulation value to wrap around, the DDS 2 sets the initial value of the accumulation value to "13−4." Then, the phase accumulator 3 adds 13 to 9 that is the initial value of the accumulation value at the second reference rising of the first phase clock. After that, the DDS 2 operates similarly.

In this manner, through the adjustment of the timing at which the accumulation value wraps around, even when the accumulation value does not match the first reference value, the DDS 2 can cause the accumulation value to wrap around at almost the same timing as the timing at which the accumulation value can be considered to match the first reference value. Therefore, an appropriate value can be set as the value of the setup value 13, Value.

As in the same manner, the DDS 2 identifies the timing, corresponding to the first reference value generation timing, at which the accumulation value is considered to match the second reference value. The DDS 2 then generates a falling edge in the output clock 11 at the rising of the phase clock close to the identified timing.

With the value of the setup value 13, Value, of 46,397 decimal and the frequency of the reference clock 12, f_Reference_Clock, of 324 MHz, for example, the frequency of the output clock 11 of the DDS 2 including the 16-bit phase accumulator 3, f_DDS_Output_Clock, is expressed by Expression (2).

$$f\_DDS\_Output\_Clock = f\_Reference\_Clock * Value / 2^N \quad (2)$$
$$= 324 \text{ MHz} * 46397 / 65536$$
$$= 229.38 \text{ MHz}$$

As the DDS output clock frequency is directly determined by the reference clock frequency multiplied by the ratio of the setup value 13 to $2^N$, the modulation (update) of the setup value 13 is immediately reflected in the frequency change of the processor clock 10.

While the clock generator 1 and the processor system 60 have been described in detail, the description is in all aspects illustrative and not restrictive. The modifications above can be applied in combination as long as they are consistent with each other. It is therefore understood that numerous modifications and variations can be devised without departing from the scope of the invention.

INDUSTRY APPLICABILITY

The present invention is preferably used in a content protection system employing HDCP as a content protection technology. In particular, the present invention is preferably used in a digital display that receives AV stream content protected in HDCP 2.2 and in a digital AV receiver capable of receiving and retransmitting the AV stream content.

REFERENCE SIGNS LIST

1: clock generator
2: DDS
3: phase accumulator
4: random number generator
60: processor system

The invention claimed is:
1. A clock generator, comprising:
random number generator circuitry configured to generate random numbers;
direct digital synthesis circuitry configured to output a processor clock to processing circuitry for use in a content protection system; and
phase accumulator circuitry included in the direct digital synthesis circuitry, the phase accumulator circuitry being configured to
receive a setup value from the random number generator circuitry, the setup value changing based on the random numbers generated by the random number generator circuitry;
receive a reference clock; and
accumulate the received setup value in synchronization with the received reference clock, wherein
the setup value is composed of a plurality of bits, a predetermined number of high order bits of the plurality of bits are set by the processing circuitry, the processing circuitry receiving the processor clock outputted from the direct digital synthesis circuitry and the processing circuitry using the processor clock as an operation reference, and values of the predetermined number of the high order bits remain constant after being initialized.

2. The clock generator according to claim 1, wherein the reference clock is a multi-phase reference clock.

3. A digital display comprising the clock generator according to claim 1.

4. A digital AV receiver comprising the clock generator according to claim 1.

5. The clock generator according to claim 1, wherein a frequency of the of the processor clock is randomized based on the setup value changing based on the random numbers.

6. A processor system, comprising:

processing circuitry for use in a content protection system; and a clock generator that outputs, to the processing circuitry, a processor clock that serves as an operation reference for the processing circuitry, wherein the clock generator comprises:
  random number generator circuitry configured to generate random numbers;
  direct digital synthesis circuitry configured to output the processor clock to the processing circuitry; and
  phase accumulator circuitry included in the direct digital synthesis circuitry, the phase accumulator circuitry being configured to
    receive a setup value from the random number generator circuitry, the setup value changing based on the random numbers generated by the random number generator circuitry;
    receive a reference clock; and
    accumulate the received setup value in synchronization with the received reference clock, wherein the setup value is composed of a plurality of bits, a predetermined number of high order bits of the plurality of bits are set by the processing circuitry, the processing circuitry receiving the processor clock outputted from the direct digital synthesis circuitry and the processing circuitry using the processor clock as the operation reference, and values of the predetermined number of the high order bits remain constant after being initialized.

7. A method, comprising:

generating, using random number generator circuitry, random numbers;

outputting, using direct digital synthesis circuitry, a processor clock to processing circuitry for use in a content protection system; and receiving, using phase accumulator circuitry included in the direct digital synthesis circuitry, a setup value from the random number generator circuitry, the setup value changing based on the random numbers generated by the random number generator circuitry;

receiving, using the phase accumulator circuitry, a reference clock; and accumulating, using the phase accumulator circuitry, the received setup value in synchronization with the received reference clock, wherein the setup value is composed of a plurality of bits, a predetermined number of high order bits of the plurality of bits are set by the processing circuitry, the processing circuitry receiving the processor clock outputted from the direct digital synthesis circuitry and the processing circuitry using the processor clock as an operation reference, and values of the predetermined number of the high order bits remain constant after being initialized.

* * * * *